United States Patent Office 3,005,777
Patented Oct. 24, 1961

3,005,777
MANUFACTURE OF SURFACE-ACTIVE COMPOSITIONS
Billy W. Terry, Ponca City, Okla., assignor to Continental Oil Company, Ponca City, Okla., a corporation of Delaware
No Drawing. Filed Nov. 2, 1959, Ser. No. 850,084
17 Claims. (Cl. 252—152)

This invention relates to surface-active compositions and, more particularly, to a process for manufacturing nongelling water-soluble alkylbenzene sulfonates from a sulfur trioxide sulfonation process.

As is well known, surface-active compositions which possess cleaning, wetting, and dispersing properties may be advantageously used in the home and in many industries, for example, the textile and leather industries, for a wide variety of purposes. For various reasons it is desirable to prepare many surface-active compositions in the form of water solution and/or dispersions of sufficiently low viscosity so that they may be easily poured, pumped, and mixed. Such liquid compositions are being used in household products, for example, liquid shampoos, light duty liquid detergents, liquid rug cleaners, and liquid car wash formulations. In these liquid compositions, the triethanol amine salts of alkylbenzene sulfonic acids are commonly used because of their very high solubility in water.

Unfortunately, there is a pronounced tendency on the part of substituted ammonium alkylbenzene sulfonates to form gels when sulfur trioxide is used, as the sulfonating medium and the sulfonic acid so obtained contains appreciable quantities of free oil (unsulfonated hydrocarbon). In the sulfur trioxide sulfonation of a suitable detergent alkylate, such as Continental Oil Company's Neolene 400 (trade name), very small amounts of sulfuric acid are found in the resulting sulfonic acid. This sulfuric acid content is usually less than two weight percent of the sulfonic acid and the free oil (unsulfonated hydrocarbon) less than two percent. Under operating conditions, sulfuric acid may run as low as one half of one percent and free oil as high as five and one half to six percent. Under these conditions, gelling of the substituted ammonium alkylbenzene sulfonates will occur.

It is the principal object of this invention to prepare water-soluble substituted ammonium alkylbenzene sulfonates which form substantially nongelling and free flowing water solutions of relatively low viscosity. Other objects and advantages of the present invention will become apparent as the invention is hereinafter more fully described.

Briefly, I have discovered that the gelling tendencies of substituted ammonium alkylaryl sulfonates containing high percentages of free oil and low percentages of sulfuric acid may be alleviated by the addition thereto of a minor quantity of an amine sulfate.

Before proceeding with specific examples illustrating my invention, it may be well to indicate in general the nature of the materials employed in my method.

In the manufacture of water-soluble alkylaryl sulfonate surface-active agents, a hydrocarbon, such as $C_{12}$ alkylbenzene, is sulfonated with sulfur trioxide. This sulfonating agent has become especially popular because of the speed with which sulfonation can be carried out and because it leaves virtually no sulfuric acid in the product. Sulfonation with sulfur trioxide is customarily carried out at a rather rapid rate, partially for the purpose of preventing degradation of the product resulting from long exposure to this rather drastic reagent. The resulting alkylarylsulfonic acid often contains rather large proportions of unsulfonated hydrocarbon. When compared with crude sulfonic acids made by older sulfonating procedures, in general, the product of sulfur trioxide sulfonation is likely to contain more free oil and less sulfuric acid. Although it is possible to obtain a product with low free oil content, the color of such a product may be undesirable, especially when used in compositions sold to the housewife as the ultimate consumer. It is primarily the sulfonic acids of very high free oil content which present a gelling problem upon conversion to amine salts.

A particularly suitable sulfonic acid for use in my invention is the sulfonic acid produced by sulfonating dodecylbenzene. This hydrocarbon product is available commercially under the trade name of "Neolene 400." Physical properties of "Neolene 400" are as follows:

Specific gravity at 16° C _____ 0.8742
Average molecular weight _____ 232
ASTM D158 Engler:
    I.B.P _____ ° F __ 535
    5% _____ ° F __ 545
    10% _____ ° F __ 550
    50% _____ ° F __ 560
    90% _____ ° F __ 580
    97% _____ ° F __ 593
    F.B.P _____ ° F __ 603
Refractive index at 20° C _____ 1.4885
Viscosity at 20° C _____ centipoises ____ 14
Bromine number _____ 0.16

The sulfonic acid made by sulfonation of a hydrocarbon feedstock, such as that described above, may be converted into surface-active agents which are particularly useful in liquid detergent compositions by neutralization with alkanolamines. Mono- and diethanolamine and triethanolamine or various mixtures thereof are commonly used for this purpose. It is most convenient to employ the sulfates of the same amines to alleviate the gelling tendencies of the alkylbenzenesulfonate surface-active agents.

In order to disclose the nature of the present invention still more clearly, the following illustrative examples will be given. It is to be understood that the invention is not to be limited to the specific conditions or details set forth in these examples insofar as such limitations are specified in the appended claims. Parts are parts by weight.

*Example 1*

A mixture comprising 200 parts of water and 200 parts of dodecylbenzenesulfonic acid containing 5.35 percent free oil, which had been produced by sulfonating dodecylbenzene with sulfur trioxide, was neutralized by adding thereto 100 parts of triethanolamine. After neutralization, the resulting mixture formed a gel so viscous that it could not be worked. As used herein the term "free oil" includes both unsulfonatable and unsulfonated hydrocarbons.

*Example 2*

The procedure of Example 1 was repeated. In this example, however, the dodecylbenzene sulfonic acid contained 2.59 percent free oil. This product, after neutralization with triethanolamine, was fluid.

The results of Examples 1 and 2 indicate that the presence of excessive quantities of free oil may be one of the causes of the formation of the gel. This observation was confirmed by the fact that, when increasing increments of dodecylbenzene were added to the dodecylbenzene sulfonic acid used in Example 2 and then neutralized as dsecribed above, the viscosity of the product increased directly with the amount of dodecylbenzene added.

*Example 3*

The procedure of Example 1 was repeated. In this example 200 parts of a dodecylbenzene sulfonic acid was used which had been prepared by sulfonating dodecylbenzene with oleum. The product, after neutralization with triethanolamine, was fluid. My experiments demonstrated further that the addition of dodecylbenzene to the sulfonic acid used in Example 3, followed by neutralization with triethanolamine, had little or no effect upon the viscosity of the final product.

*Example 4*

The procedure of Example 1 was repeated with the exception that 15 parts of sulfuric acid was added to 235 parts of dodecylbenzene sulfonic acid prior to neutralization. The final product was fluid.

*Examples 5–11*

In each of these examples, the procedure of Example 1 was repeated through the neutralization step, after which 15 parts of the amine sulfate listed below was added to the resulting gel:

Normal butyl amine sulfate
Triethyl amine sulfate
Ethyl amine sulfate
Mixed isopropynol amine sulfate
Monoethanol amine sulfate
Diethanol amine sulfate
Triethanolamine sulfate In each of the Examples 5 to 11, the addition of the amine sulfate broke the gel, resulting in a fluid product. Any of the original amines listed above as salts may be used for neutralizing the sulfonic acid.

While I do not wish to be bound by any theory as to how the desirable results of my invention are attained, it appears that the amine sulfate will break the gel or reduce its viscosity by acting as a solubilizing agent. This is suggested by the fact that dodecylbenzenesulfonic acid, after neutralization with triethanolamine, has a water solubility of over 60 percent. This should be contrasted with the solubility of the product obtained by neutralization with sodium hydroxide. In the latter case, the solubility in water was less than 20 percent. This solubility behavior of the two products is aptly illustrated by another factor, the cloud point. In the case of the sodium dodecylbenzene sulfonate, the cloud point of a 20 percent solution was 65° F. On the other hand, the cloud point of triethanolamine neutralized product was about 15° F. at a concentration of about 50 to 60 percent.

The beneficial effect obtained by adding an amine sulfate to a sodium alkyl aryl sulfonate tends to substantiate my theory that the action is primarily one of solubilization. Fifty-nine parts by weight of 51 percent active sodium alkylbenzenesulfonate in the form of an aqueous slurry was treated with 4 parts by weight of triethanolamine sulfate. After stirring, this concentrate became considerably less viscous. The effect was considerably greater than that obtained by use of sodium xylenesulfonate, the conventional solubilizing agent employed in liquid detergent compositions.

As to the amounts of the different components used, these may vary widely. A sufficient quantity of water should be used to dissolve the sulfonic acid and the final sulfonate. This can be determined in most cases from available literature or by a simple experiment. A greater quantity of water may, of course, be used if desired. A suitable quantity of the amine is the amount necessary to neutralize the sulfonic acid present, plus any sulfuric acid that may be present. A slight excess of the amine may be used if desired. As to the amount of the amine sulfate used, that may vary from about 5 to 15 weight percent, based on the weight of the sulfonic acid used. A greater quantity of the amine sulfate may be used without any detrimental effects. Such a procedure is generally undesirable because no beneficial effects are imparted thereby.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. In a process for manufacturing a water-soluble alkaryl sulfonate composition in which an alkaryl hydrocarbon is sulfonated with sulfur trioxide to produce a crude sulfonation product containing an alkaryl sulfonic acid, free oil and sulfuric acid, in which the alkaryl sulfonic acid is neutralized with an amine selected from the group consisting of alkyl amines and alkanol amines, and in which the amount of free oil in the crude sulfonation product is sufficient to cause gelling on neutralization, the improvement which comprises adding a sufficient amount of an amine sulfate selected from the group consisting of lower alkyl amine sulfates and lower alkanol amine sulfates thereto to provide a product free from gellation.

2. A process according to claim 1 wherein the hydrocarbon portion of the water-soluble sulfonate has a molecular weight of less than 350.

3. A process according to claim 1 wherein the water-soluble sulfonate is the salt of dodecylbenzene sulfonic acid.

4. A process according to claim 1 wherein the amine is triethanolamine.

5. A process according to claim 1 wherein the amine is normal butylamine.

6. A process according to claim 1 wherein the amine is triethylamine.

7. A process according to claim 1 where the amine is ethylamine.

8. A process according to claim 1 wherein the amine sulfate is triethanolamine sulfate.

9. A process according to claim 1 wherein the amine sulfate is normal butylamine sulfate.

10. A process according to claim 1 wherein the amine sulfate is triethylamine sulfate.

11. A process according to claim 1 wherein the amine sulfate is ethylamine sulfate.

12. A process according to claim 1 wherein the amine sulfate is diethanolamine sulfate.

13. A process according to claim 1 wherein the amine sulfate is added prior to neutralization, whereby gelling is prevented.

14. A process according to claim 1 wherein the amine sulfate is added after gellation has occurred, whereby said gel is broken.

15. A process according to claim 1 wherein the amine employed for neutralization is triethanolamine and wherein the amine sulfate added subsequent thereto is triethanolamine sulfate.

16. A process according to claim 15 wherein the amine sulfate is added prior to neutralization, whereby gelling is prevented.

17. A process according to claim 15 wherein the amine sulfate is added after gellation has occurred, whereby said gel is broken.

References Cited in the file of this patent

UNITED STATES PATENTS

| | | |
|---|---|---|
| 2,364,767 | Zizinia et al. | Dec. 12, 1944 |
| 2,926,142 | Eccles et al. | Feb. 23, 1960 |